Feb. 2, 1971 HIROMI MATSUMOTO 3,560,895

TUNED TRANSFORMER WITHOUT TUNING CAPACITOR

Filed July 10, 1967 3 Sheets-Sheet 1

INVENTOR.
HIROMI MATSUMOTO
BY
H. Edward Maslern

INVENTOR.
HIROMI MATSUMOTO
BY
H. Edward Maslen

INVENTOR.
HIROMI MATSUMOTO

BY

H. Edward Mestern

United States Patent Office 3,560,895
Patented Feb. 2, 1971

3,560,895
TUNED TRANSFORMER WITHOUT TUNING CAPACITOR

Hiromi Matsumoto, Tokyo-to, Japan, assignor to Toko Kabushiki Kaisha, Higashiyukigaya, Ota-ku, Tokyo-to, Japan, a joint-stock company of Japan
Filed July 10, 1967, Ser. No. 652,085
Claims priority, application Japan, July 14, 1966, 41/46,118; Dec. 20, 1966, 41/115,902, 41/115,903; Dec. 21, 1966, 41/116,452
Int. Cl. H03h 7/08
U.S. Cl. 333—76 2 Claims

ABSTRACT OF THE DISCLOSURE

A winding for creating capacitance is wound parallelly together with a part of a tuning coil of a tuned transformer to produce a distributed capacitance between the terminals of the tuning coil, and points in the winding and coil of respectively different potential are connected to increase the distributed capacitance, which in suitable combination with the inductance of the tuning coil produces a desired resonance frequency without the use of an external tuning capacitor. Consistently constant distributed capacitance is obtained in production.

This invention relates to electrical transformer and more particularly and principally to tuned transformers such as intermediate-frequency transformers for transistorized radio receiving circuits.

More specifically, the invention is highly effective when applied to tuned transformers whose prime purpose is to provide gain through their use as impedance transformers rather than to obtain selectivity.

In general, in a tuned transformer a specific resonance frequency is obtained by the combination of a tuning coil and an external tuning capacitor. Recently, however, the tuned transformers of low Q value for wide band applications has been developed, and one in which the distributed or stray capacitance of the tuning coil is utilized in place of a discrete external tuning capacitance has been proposed.

However, in a tuned transformer in which a ordinary spool-type ferrite bobbin of a size of the order of 4-mm. diameter and 5-mm. height is used, a distributed capacitance of the order of only about 3 to 10 pf. can be obtained. Consequently, in order to use such a bobbin to obtain a specific resonance frequency, it becomes necessary to increase the inductance of the tuning coil to an extremely high value by winding a large number of turns. Therefore, it is difficult to reduce a tuned transformer of this character to practice.

While a tuned transformer of this character does not require an external capacitor or capacitors and is, therefore, of relatively low price, it has heretofore been accompanied by the difficulty of obtaining consistent values of the distributed capacitance in production.

It is an object of the present invention to provide a practical, low-price tuned transformer in which an external tuning capacitor or capacitors are not necessary.

A specific object of the invention is to provide a tuned transformer having a tuning coil in which a distributed capacitance of high value is obtained between the terminals of the tuning coil by a unique winding arrangement wherein a winding for creating capacitance is wound parallelly with a part of the tuning coil.

Another object of the invention is to provide simple techniques for winding the tuning coil and the winding for creating capacitance with insulated wires in a closely contacting, parallel state thereby to produce tuned transformers of the above stated character, of any one type, with consistently constant distributed capacitance between the terminals of the tuning coil or coils and thereby with stable characteristics and high yield rate.

A further object of the invention is to provide a tuned transformer of the above stated character which can be readily produced on a mass production scale.

According to the present invention, briefly summarized, there is provided a tuned transformer having a tuning coil and a winding for creating capacitance wound parallelly together with a part of the tuning coil, a point in the tuning coil being connected to a point of different potential in the capacitance creating winding thereby to cause an increase in the distributed capacitance between the terminals of the tuning, a desired resonance frequency being obtained by a suitable combination of the distributed capacitance and the inductance of the tuning coil, the distributed capacitance for any one type of tuned transformer being made consistently constant.

The nature, principle, and details of the invention, as well as the utility thereof, will be more clearly apparent from the following detailed description with respect to preferred embodiments of the invention when read in conjunction with the accompanying drawings, in which the same and similar parts are designated by like reference characters and numerals.

Figure 6:
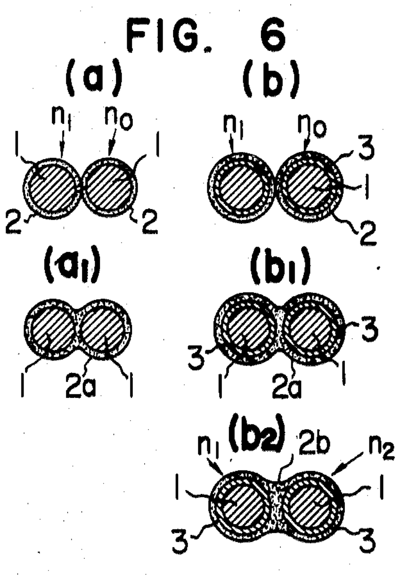
Figure 7:
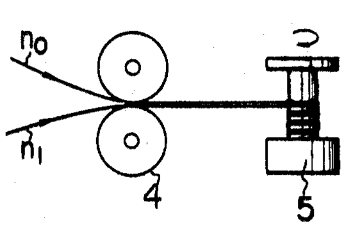
Figure 8:
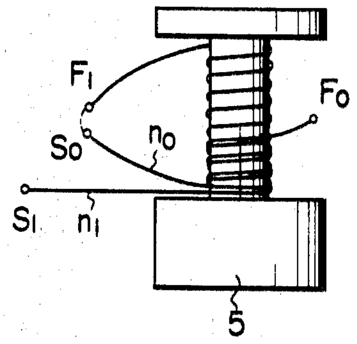
Figure 9:
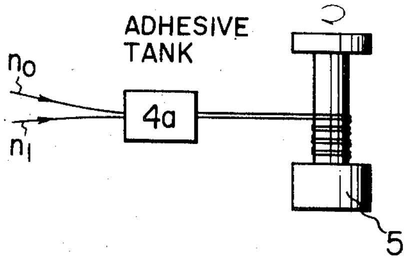
Figure 10:
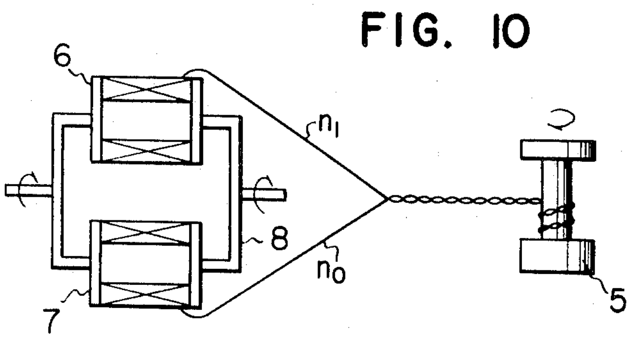
Figure 11:
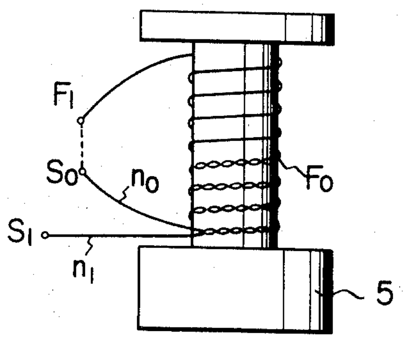

FIGS. 6(*a*), 6(*b*), 6($a_1$), 6($b_1$), and 6($b_2$) are enlarged cross sectional views showing examples of construction of winding wires in accordance with the invention;

FIG. 7 is a simplified view showing an example of the process of winding a spool-type ferrite bobbin with winding wire;

FIG. 8 is a side view of a spool type ferrite bobbin and the state of windings thereon;

FIG. 9 is a simplified view showing another example of the process of winding a bobbin;

FIG. 10 is a simplified view showing an example of the process of winding a bobbin with twisted winding wire; and FIG. 11 is a side view of a bobbin and state of twisted windings wound thereon as indicated in FIG. 10.

As conducive to a full understanding of the present invention, the following brief consideration of the principle thereof is first presented.

Figure 1:
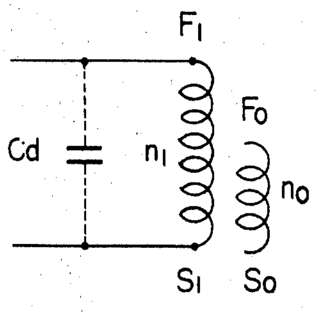
FIG. 1 is a schematic diagram for an explanation of the principle of the invention.

Referring to FIG. 1, the electrical elements shown therein are a tuning coil $n_1$ and a winding $n_0$ for generating capacitance (hereinafter referred to as a "capacitance winding") wound parallelly together with the tuning coil $n_1$, the winding start points of the coil $n_1$ and winding $n_0$ being respectively designated by reference characters $S_1$ and $S_0$, and the winding end points thereof being respectively designated by $F_1$ and $F_0$. The distributed capacitance appearing between the terminals $S_1$ and $F_1$ of the tuning coil $n_1$ is represented by capacitance *Cd*.

From the results of experiments carried out in connection with the present invention, it was found that capacitance *Cd* does not function effectively when the tuning coil $n_1$ and the capacitance winding $n_0$ are merely wound in parallel manner as indicated in FIG. 1, but the following phenomena were also discovered.

(1) When the start point $S_0$ of the capacitance winding $n_0$ is connected to the end point $F_1$ of the tuning coil $n_1$, capacitance $Cd$ becomes effectively operative.

(2) When the end point $F_0$ of the capacitance winding $n_0$ is connected to the start point $S_1$ of the tuning coil $n_1$, also, capacitance $Cd$ is still effective but its value is lowered.

Figure 5:
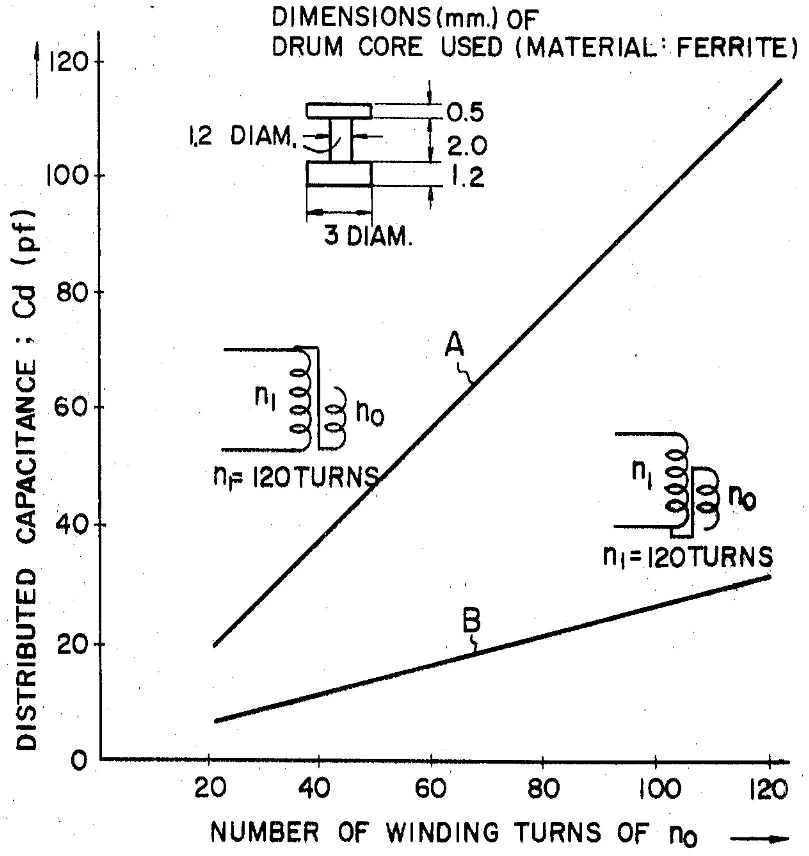
FIG. 5 is a graphical representation indicating relationships between number of winding turns and distributed capacitance of capacitance windings.

The experimental results relating to the above phenomenon (1) are indicated by curve A in FIG. 5. Curve A was obtained from measured values of the distributed capacitance $Cd$ generated between the terminals of the tuning coil when insulated copper wire of 0.07-mm. diameter was wound around a bobbin of the dimensions indicated in FIG. 5, and with a tuning coil $n_1$ of 120 turns, the number of turns of the capacitance winding $n_0$ was progressively varied.

Equivalent results (under the same conditions as those for curve A) relating to the above phenomenon (2) are indicated by curve B in FIG. 5.

As indicated by these results, it was found that the distributed capacitance $Cd$ increases with the number of turns of the capacitance winding $n_0$ and becomes a controllable value for obtaining a required resonance frequency.

It was found further that, in general, the distributed capacitance $Cd$ can be caused to operate more effectively by connecting terminals $S_0$ and $F_1$ in the case where the capacitance winding $n_0$ is wound together with the tuning coil $n_1$ on the side of $S_1$ thereof, as indicated in FIG. 1, and by connecting terminals $F_0$ and $S_1$ in the converse case where the capacitance winding $n_0$ is wound together with the tuning coil $n_1$ on its side of $F_1$.

Results of experiments indicate that, in the case where the winding start points of the windings $n_1$ and $n_0$ are placed adjacently together as shown in FIG. 1, when a ratio of the numbers of winding turns of windings $n_0$ and $n_1$ of approximately 1:3 is used, and terminals $F_1$ and $S_0$ are connected, the product of the inductance of tuning coil $n_1$ and the distributed capacitance $Cd$ becomes maximum (and, consequently, the resonance frequency becomes minimum).

However, since the variables such as the number of winding turns of winding $n_0$ and the value of the distributed capacitance $Cd$ can be selected at will, the desired resonance frequency can be easily obtained by first determining the value of the inductance of tuning coil $n_1$ in accordance with the load and then suitably selecting the number of winding turns of winding $n_0$.

The above described principle is practically utilized in the present invention as described below with respect to preferred embodiments.

Figure 2:
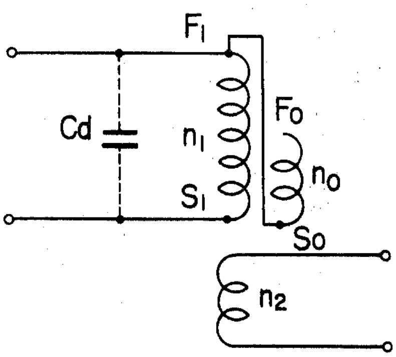
FIGS. 2 and 3 are connection diagrams showing examples of tuned transformers embodying the invention.
Figure 3:
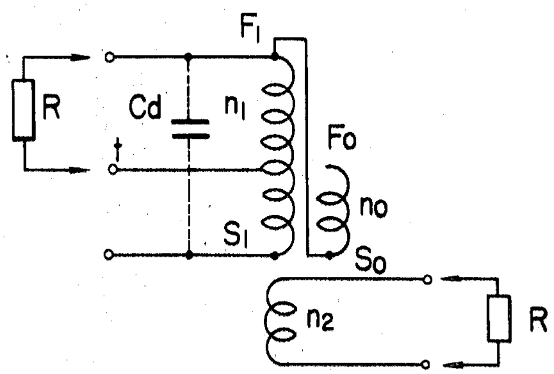

In each of the examples illustrated in FIGS. 2 and 3, the tuned transformer has a tuning coil $n_1$ on the primary side, a coil $n_2$ on the output side, and a capacitance winding $n_0$, which is wound parallelly together with the tuning coil $n_1$ from the winding start point thereof and terminates at an end $F_0$ which is left unconnected. Only the terminal $S_0$ of the winding $n_0$ is connected to terminal $F_1$ of the coil $n_1$. In each example, accordingly, a distributed capacitance $Cd$ is produced across the two terminals of the coil $n_1$ in accordance with the number of winding turns of the winding $n_0$ for the reasons described above. Therefore, it is possible to obtain the required resonance frequency by means of this capacitance $Cd$ and the inductance of the coil $n_1$.

The tuning coil $n_1$ and the capacitance winding $n_0$ can be connected at any of their respective points to produce some effect provided these points have different potentials, although the effect thus produced varies in degree. For example, terminals $F_1$ and $F_0$ may be connected, and terminal $S_0$ left unconnected.

Figure 4:
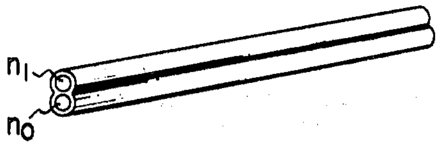
FIG. 4 is an enlarged, fragmentary, perspective view showing one example of winding wires suitable for use in accordance with the invention.

To wind the tuning coil $n_1$ and the capacitance winding $n_0$ parallelly together, separate wires may be drawn together and taken up in side-by-side arrangement by rotating the bobbin. Alternatively, a twin wire consisting of the integral combination of two paired wires $n_1$ and $n_0$ as shown in FIG. 4 and as described more fully hereinafter with reference to FIGS. 7, 8, and 9 or FIGS. 10 and 11 may be used. Furthermore, two or more lengths of wire may be wound in parallel for the capacitance winding $n_0$. Ordinarily, the procedure of winding of the windings $n_1$ and $n_0$ with their start points placed together as illustrated is most suitable for quantity production.

Furthermore, in a tuned transformer, in general, it is necessary to select the load connecting points on both the primary and the secondary sides in a manner to match the value of the load resistance. Accordingly, there are cases in which, for example, as illustrated in FIG. 3, a tap $t$ is established at an intermediate point of the tuning coil $n_1$, and a load R is connected between tap $t$ and terminal $F_1$, and in some cases the load is connected between tap $t$ and terminal $S_1$.

In certain special cases, it is possible to use winding $n_0$ doubly to replace coil $n_2$ on the output side, but, in general, winding $n_0$ and coil $n_2$ do not assume the same value.

In the case of double tuning, it is possible, of course, to provide a coil also on the output side with a capacitance winding similarly as on the primary side and thereby to omit an external tuning capacitor on the output side.

The present invention, in another aspect thereof as mentioned hereinbefore, contemplates the elimination of deviations in the distributed capacitance $Cd$.

In general, the distributed capacitance $Cd$ is substantially proportional to the length of the wire of winding $n_0$, and, accordingly, it should be possible to determine the magnitude of this capacitance $Cd$ by controlling the wire length of winding $n_0$. In actual practice, however, even when the length of winding $n_0$ is made constant, the value of $Cd$ does not become constant.

While various reasons for this disparity can be considered, the principal cause thereof may be considered to be irregularities in the mutually parallel state of the wires of windings $n_1$ and $n_0$.

For example, as the wires of windings $n_1$ and $n_0$ are aligned parallelly and wound around a bobbin, the first single layer of winding can be wound in a neat and closely parallel state. From the succeeding second layer, however, the wound wires of each lower layer tend to assume a state wherein they intrude into the spaces between the windings $n_1$ and $n_0$ of the adjacently upper layer. Consequently, the intended closely parallel state of the windings $n_1$ and $n_0$ in the upper layer is disturbed, whereby the distributed capacitance between the windings $n_1$ and $n_0$ also tends to become irregular.

This difficulty is overcome by the present invention in the following manner.

In one example of winding process according to the invention, the two wires for windings $n_1$ and $n_0$ are prepared as indicated by the examples in FIGS. 6(*a*) and 6(*b*). In FIG. 6(*a*), each of conductor wires 1 is coated over its surface with a thermoplastic material 2 such as a polystyrene resin or a polyethylene resin. In FIG. 6(*b*), each of conductor wires 1 is coated over its surface with an electrically insulative material 3 having high resistance to heat, and over this coating 3 a thermoplastic material 2 is applied.

The wires thus prepared, as in FIG. 6(*a*) or FIG. 6(*b*), are caused to be fed in closely contacting, parallel alignment through a bonding device such as, for example, a pair of heat materials rollers 4 as illustrated in FIG. 7, whereupon the thermoplastic materials 2 and 3 are mutually bonded together to form an integral envelope 2*a*, and the two wires are thereby integrally bonded into a twin wire as indicated in FIGS. 6($a_1$) and 6($b_1$).

The twin wire thus formed is then taken up on the bobbin 5, whereby it is possible to wind the tuning coil $n_1$ and capacitance winding $n_0$ in a constantly closely disposed, parallel state.

Then, after the specified length of the wire of winding $n_0$ has been thus wound, the winding of only the wire of winding $n_1$ is continued, and the winding end $F_1$ thereof is connected to the start end $S_0$ of the winding $n_0$ (the winding end $F_0$ of the winding $n_0$ being left unconnected), whereby the tuned transformer of the invention is obtained.

The connecting points of the windings $n_1$ and $n_0$ are not necessarily limited to terminals $F_1$ and $S_0$. For example, it is also possible to connect terminals $S_1$ and $F_0$ and to leave terminal $S_0$ unconnected. It has been found, however, that the connection of terminals $F_1$ and $S_0$ as indicated in FIGS. 2, 3, and 8 is most suitable for quantity production and, moreover, produces the maximum value of the distributed capacitance $Cd$.

Thus, as described above, the present invention in one aspect thereof provides a method for winding the tuning coil $n_1$ and the capacitance winding $n_0$ in a tuned transformer according to the invention, which comprises coating the exterior surfaces of the wires of these windings with a thermoplastic material 2, passing these wires thus coated between heating means as they are fed in a closely aligned parallel state thereby to bond these wires into an integral twin wire, and then taking up this twin wire on a bobbin. Accordingly, the closely disposed parallel state of the windings is maintained throughout the winding of parallelly wound part of the two windings $n_1$ and $n_0$, whereby the distributed capacitance $Cd$ can be consistently produced at a constant value.

Furthermore, since a thermoplastic material 2 of a substance such as polystyrene and polyethylene is used, a dielectric barrier of highly desirable characteristics with respect to high frequencies is disposed between the windings $n_1$ and $n_0$. Moreover, since the temperature coefficient of the dielectric constant of this barrier is small, the temperature characteristics of the transformer are improved.

In cases where only the thermoplastic material 2 does not provide sufficient strength, it is possible to increase the surface strength, for example, by employing a thermomosetting film 3 of high heat resistance as illustrated in FIGS. 6($b$) and 6($b_1$).

Furthermore, by bonding together the two above described windings $n_1$ and $n_0$ by means of a thermoplastic materials, there is afforded the advantage feature wherein the two windings can be readily separated merely by applying heat to these wires.

In another example of winding process according to the invention, the two wires for windings $n_1$ and $n_0$ are prepared as described in the foregoing example and as illustrated by FIGS. 6($a$) and 6($b$). Then, as illustrated in FIG. 9, the two wires thus prepared are passed in closely contacting, parallel state through an adhesive tank 4$a$ thereby to be coated with an adhesive 2$b$ and be integrally bonded thereby. Thus, a twin wire as shown in FIG. 6($b_2$) is formed. This twin wire is then wound around a bobbin 5 as in the above described example.

In accordance with the invention, consistently constant values of the distributed capacitance $Cd$ can be obtained also by uniformly twisting together the wires of the tuning coil $n_1$ and the capacitance winding $n_0$, winding the resulting twisted wires around the bobbin 5, and then connecting respective points of the windings $n_0$ and $n_1$ of different potentials.

In one example of process for this winding technique as indicated in FIG. 10, the wires respectively for the windings $n_1$ and $n_0$ are stored on reels 6 and 7 rotatably supported on a rotating frame 8 and are thereby uniformly twisted together. The twin wire thus twisted is then taken up on a bobbin 5 as in the above described two examples. FIG. 11 diagrammatically illustrates a transformer thus formed. As described hereinbefore, the winding end terminal $F_1$ of the tuning coil $n_1$ is connected to the winding start terminal $S_0$ of the capacitance winding $n_0$, whose winding end $F_0$ is left unconnected.

In this case, also, connection of terminals $F_1$ and $S_0$ is most suitable for quantity production and, moreover, results in maximum value of capacitance $Cd$. In this case, also, the selection of a ratio of the numbers of winding turns of windings $n_0$ and $n_1$ of approximately 1:3 results in maximum product of the inductance of the tuning coil $n_1$ and the capacitance $Cd$. Instead of twisting the winding $n_0$ with the winding start point of the tuning coil $n_1$, it may be twisted with the winding end point of the tuning coil $n_1$.

By this procedure, with the windings $n_1$ and $n_0$ uniformly twisted form on the bobbin, a uniform and closely contacting state of the windings $n_1$ and $n_0$ is fixedly established, that is, in effect, equivalent to a parallelly wound state, whereby the distributed capacitance $Cd$ can be made constant by using wires of constant length for the capacitance winding $n_0$.

Thus, the present invention makes possible the practical realization of a low-price tuned transformer in which external tuning capacitors are not required. Furthermore, since the tuning coil and capacitance windings are parallelly wound together, there are few irregularities in the distributed capacitance $Cd$, and it is possible to produce products with highly stable characteristics with high yield on a quantity production scale.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claims.

What I claim is:

1. A tuned transformer comprising a tuning coil, a capacitance winding, at least one output winding, and a bobbin, the tuning coil and the capacitance winding being wound with wires respectively coated with electrically insulative materials and bonded together in a closely contacting, parallel state by an adhesive, thereby forming an integral multiple-conductor wire, said wire being wound on the bobbin corresponding to the desired length of the capacitance winding, and only the tuning coil being further wound, and a terminal in the tuning coil being connected to a terminal of different potential in the capacitance winding.

2. A tuned transformer comprising a tuning coil, at least one output winding and a capacitance winding wound parallel together with a part of the tuning coil, a point in the tuning coil being connected to a point of different potential in the capacitance winding thereby to cause an increase in the distributed capacitance between the two terminals of the tuning coil, and a desired resonance frequency being obtained by a combination of the distributed capacitance and the inductance of the tuning coil, in which the ratio of the numbers of winding turns of the tuning coil and the capacitance winding is approximately 3:1, and the winding start terminal of the capacitance winding is adjacent the winding start terminal of the tuning coil and is connected to the winding end terminal of the tuning coil, the winding end terminal of the capacitance winding being left unconnected.

References Cited

UNITED STATES PATENTS

| | | | |
|---|---|---|---|
| 3,435,386 | 3/1969 | Jacob | 333—76 |
| 3,201,698 | 8/1965 | Irelan | 325—477 |
| 2,692,372 | 10/1954 | Goldstine | 333—79 |

HERMAN KARL SAALBACH, Primary Examiner

C. BARAFF, Assistant Examiner

U.S. Cl. X.R.

29—605; 333—70, 84